United States Patent [19]
Carrara

[11] 3,773,410
[45] Nov. 20, 1973

[54] MOVIE VIEWER
[76] Inventor: Luis Carrara, 73 Greenwood St., Lawrence, Mass.
[22] Filed: June 1, 1972
[21] Appl. No.: 258,763

[52] U.S. Cl..................... 352/129, 352/95, 352/239
[51] Int. Cl. .......................................... G03b 21/00
[58] Field of Search...................... 352/95, 129, 242, 352/137, 169, 239

[56] References Cited
UNITED STATES PATENTS

| | | | |
|---|---|---|---|
| 3,238,008 | 3/1966 | Krumbein | 352/169 |
| 2,912,900 | 11/1959 | Cherouvrier | 352/129 X |
| 3,212,838 | 10/1965 | Martin | 352/78 R |
| 3,306,697 | 2/1967 | Nemeth | 352/129 |
| 3,276,837 | 10/1966 | Kuppenbender | 352/83 |
| 2,122,804 | 7/1938 | Tichenor | 352/129 |
| 3,597,058 | 8/1971 | Nicosia | 352/129 X |
| 3,264,051 | 8/1966 | Melton | 352/129 |
| 2,511,334 | 6/1950 | Gruber | 352/129 X |

FOREIGN PATENTS OR APPLICATIONS

| | | | |
|---|---|---|---|
| 641,211 | 6/1962 | Italy | 352/129 |
| 1,395,748 | 3/1965 | France | 352/129 |

Primary Examiner—Monroe H. Hayes
Attorney—Gerald Altman et al.

[57] ABSTRACT

A battery-operated, hand-held movie viewer is provided for individual viewing. The viewer has a piston-shaped configuration to facilitate holding and viewing through a lens at the rear end thereof. An internal lighting system illuminates the film fed through the housing and driven by a motor-operated indexing mechanism. A film with two rows of side-by-side frames is employed. One row of frames is run in a direction reverse to that of the other row, with the images in the frames along one row being inverted with respect to those of the other row. Thus, the film can be run in either direction by merely changing the position of the reels without rewinding.

2 Claims, 7 Drawing Figures

PATENTED NOV 20 1973 3,773,410
SHEET 2 OF 2
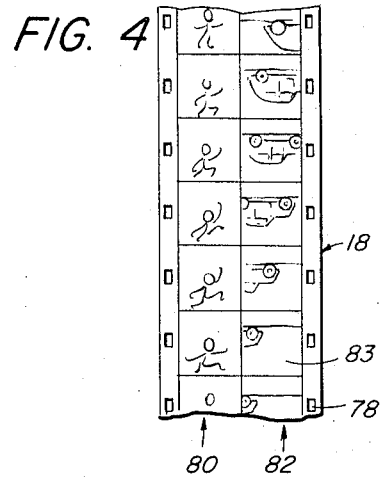
FIG. 4
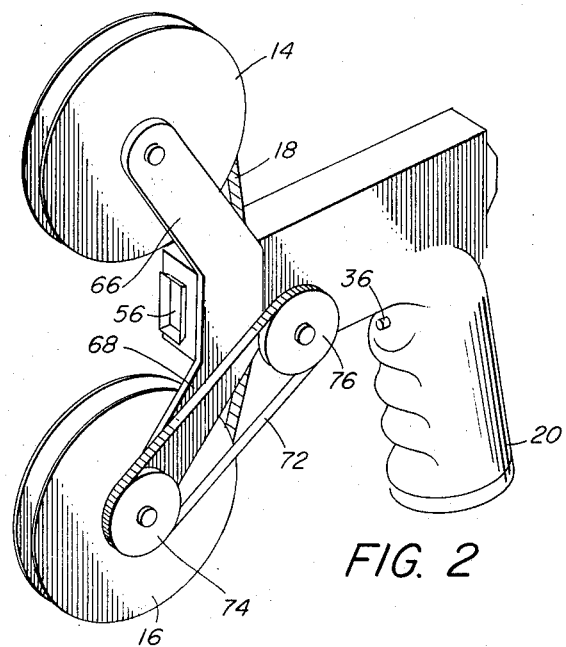
FIG. 2
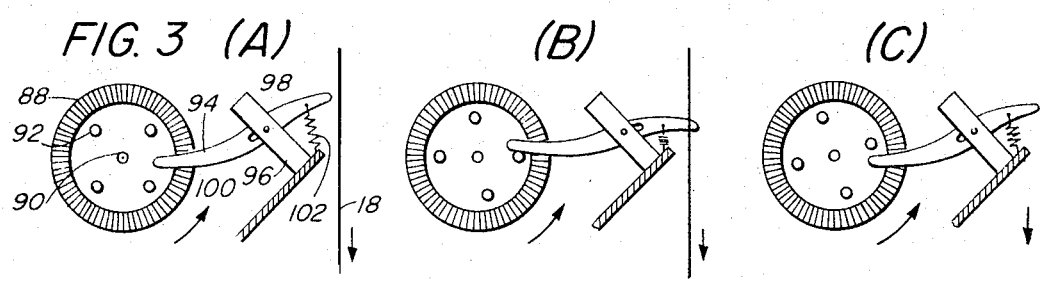
FIG. 3 (A)  (B)  (C)
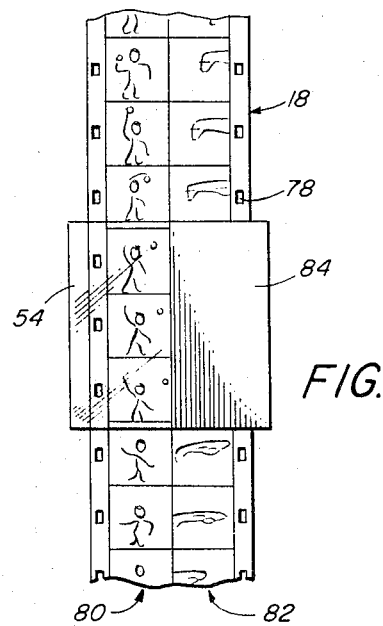
FIG. 5

MOVIE VIEWER

BACKGROUND OF THE INVENTION

1. Field of the Invention

This invention relates generally to movie viewers and more particularly is directed towards a hand-held, battery-operated movie viewer of simple construction adapted for individual viewing of a movie. This invention is also directed towards a movie film having parallel rows of frames with respectively inverted images to eliminate rewinding of the film after each run.

2. Description of the Prior Art

Most movie projectors utilize a high intensity bulb and an optical system to project the image on a transparency onto a screen. Such projectors usually are rather large and expensive and require a connection to a conventional 110 volt power source. Some motion picture viewers have been available which operate on batteries to provide a light source, the operator viewing the film through an eyepiece. In such cases the film normally is advanced by a hand-operated mechanism and usually the film is in a continuous loop or in a cartridge. Those that use the conventional spool of reels require that the films be rewound after each run.

Viewers and projectors of this sort have not been entirely satisfactory since hand-operation tends to be somewhat erratic in controlling the speed of the film and the need to rewind the film after each use is time-consuming. Further, the mechanism involved in projectors and viewers of this type tends to be rather complex and somewhat expensive.

Accordingly, it is an object of the present invention to provide a new and improved hand-held movie viewer having a battery-operated motor and a light source serving to drive the film at a uniform speed and illuminate the film. Another object of this invention is to provide a movie film which need not be rewound after each use. A further object of this invention is to provide a film advance mechanism of simple and efficient construction.

SUMMARY OF THE INVENTION

This invention features a hand-held movie viewer, comprising a pistol-shaped housing, a battery mounted in the handle of the housing, a finger-actuated switch mounted in the grip of the handle, a constant speed motor mounted in the housing and a light mounted in the housing, both the light and the motor sequentially responsive to the actuation of the switch. An optical system is mounted within the housing for viewing one side of a film running through the housing. The drive mechanism includes a spring-loaded, gear-actuated lever which drives the film through the housing. The film is formed with two rows of frames, only one row of which is viewed at a time, the other being masked out. When the film is run through once, the reels are reversed in position and the need for rewinding is eliminated.

BRIEF DESCRIPTION OF THE DRAWINGS

FIG. 2 is a view in perspective showing the opposite side of the viewer, FIGS. 3 a, b, and c are detailed side views showing the film advance mechanism, FIG. 4 is a view in front elevation of a film made according to the invention, and, FIG. 5 is a detailed front elevation of a film in position within the viewer.

DETAILED DESCRIPTION OF THE PREFERRED EMBODIMENT

Figure 1:
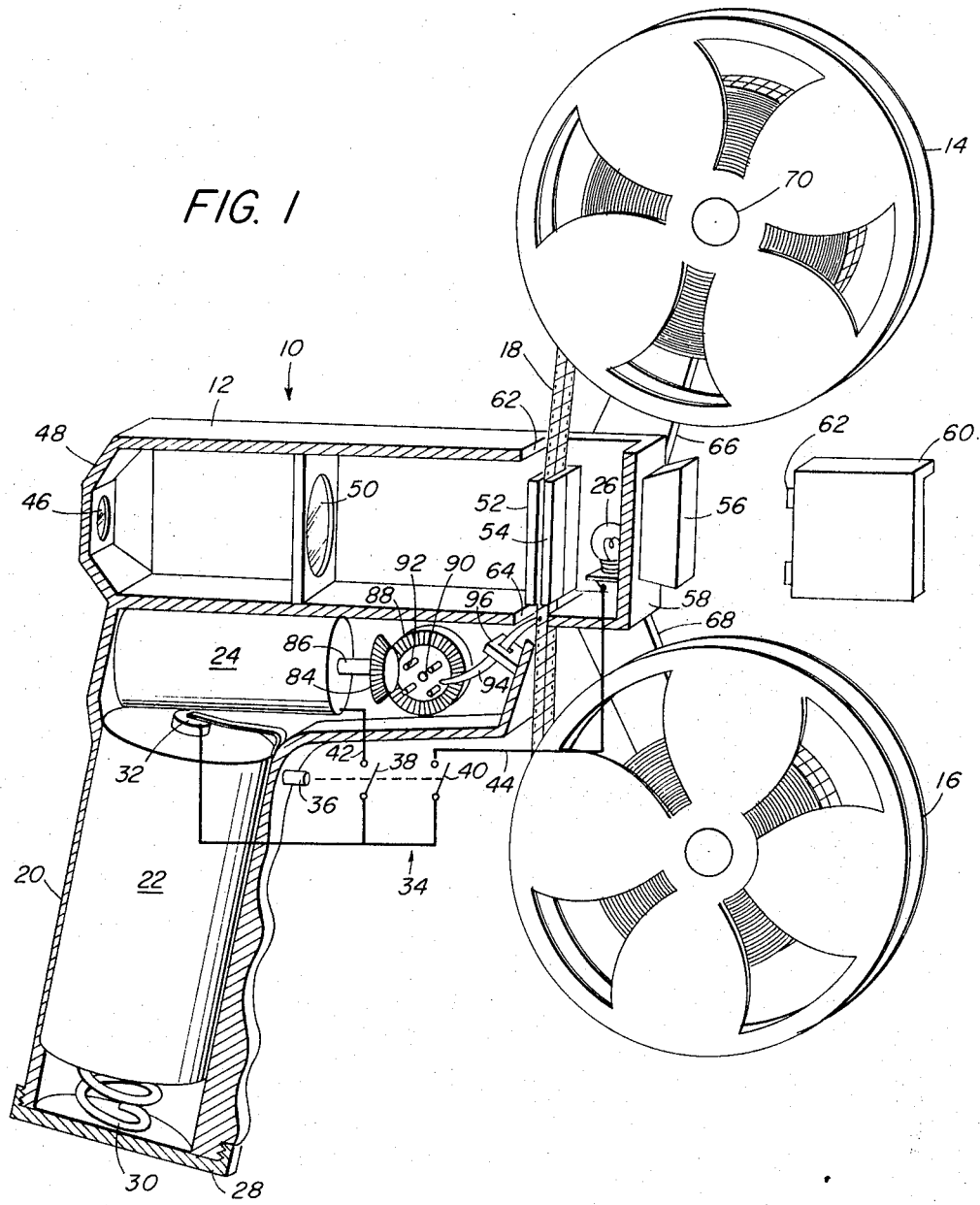
FIG. 1 is a view in perspective, partly in section, of a viewer made according to the invention.

Referring now to the drawings and to FIGS. 1 and 2 in particular, the reference character 10 generally indicates a hand-held, battery-operated viewer organized about a housing 12 adapted to support a pair of reels 14 and 16 about which is wound a strip of movie film 18.

The housing 12 has a generally pistol-shaped configuration and typically may be cast or molded of plastic, metal or the like. The housing includes a downwardly extended hollow handle portion 20 which serves not only as a hand grip for the viewer but also receives a battery 22 for energizing a constant speed DC motor 24 and a bulb 26. The battery is held in position by means of a screw cap 28 with a coil spring 30 compressed between the cap and the base of the battery in the usual fashion. The upper end of the battery bears against a contact 32 electrically connected to a double-pole switch 34 actuated by means of a trigger or button 36 at the top of the handle 20.

The switch 34 is provided with a pair of contacts 38 and 40, the contact 38 adapted to close a circuit through a lead 42 to the motor 24 while the contact 40 is adapted to close a circuit to the bulb 26 through a lead 44. The switch is constructed in such a fashion that, when the button 36 is depressed, first the contact 40 will close to illuminate the bulb 26 and, if the button is further depressed, the contact 38 will then be closed to energize the motor 24. Thus, the film may be stopped at any point and a single frame on the film may be observed by merely relieving pressure on the button 36.

The upper portion of the housing 12 is formed into a tubular chamber enclosing the optical system which includes an eye-piece 46 at the left-hand end thereof as viewed in FIG. 1 and mounted in an end wall 48. A magnifying lens 50 is mounted along the optical axis within the tubular chamber. At the right-hand end of the tubular chamber there is mounted a pair of flat glass plates 52 and 54 in slightly spaced parallel relation to guide the film 18 which is threaded between the two plates. Directly behind the two plates is a lamp 26 which, when illuminated, permits the film to be viewed through the eyepiece 46. To further illuminate the film, a window 56 is provided in an extreme right-hand wall 58 of the housing. To provide access to the interior and to facilitate threading of the film, a cover 60 is detachably connected to the housing and, in the illustrated embodiment, encloses a corner section of the right-hand upper portion of the housing adjacent the plates 52 and 54 and the lamp 26. The cover 60 preferably is provided with tabs 62 adapted to snap into cooperating indents in the housing for ease of mounting and removing. Above and below the glass plates 52 and 54 the housing 12 is formed with slot openings 62 and 64 through which the film 18 passes into and out of the housing.

The film is advanced downwardly from the upper reel 14 and wound onto the takeup lower reel 16. The reels 14 and 16 are rotatably mounted on the outer ends of a pair of arms 66 and 68 and are detachably connected thereto by any suitable retainers 70 which permit ready removal and replacement of the reels onto spindles provided at the end of the arms. The lower reel 16 is driven by means of a belt 72, typically in the form of a coil spring loop, drivingly engaging a pulley 74 on the end of the lower arm 66 and to a pulley 76 in order to be driven by the motor 24 as will presently appear.

The film 18, as best shown in FIG. 4, is formed with sprocket holes 78 along both marginal edges as is usually found in 16 millimeter and 35 millimeter film to permit the film to be advanced by a driving mechanism. Between the sprocket holes the film is provided with two rows 80 and 82 of frames 83 arranged side-by-side and lengthwise along the film. The frames are of equal size and disposed on either side of the film center line. The frames may be of any type of photographic image in a typical movie sequence, however, the images of one row will be inverted with respect to the images of the other row and will be in reversing sequence. When a film is viewed with the viewer only one row at a time is viewed, this being accomplished by masking one row. As shown in FIG. 5, the masking may be readily accomplished by rendering one half of the glass plates 52 and 54 opaque as suggested by the shaded area 84. The plates may be made opaque by coating with an opaque material or adding an opaque sheet of metal plastic or the like to effectively mask out one of the rows (82) of frames, leaving the other row 80 visible. When the film is run through the viewer, the frames on the row 80 will be observed by the viewer in the normal sequence and the film will unwind from the reel 14 and be wound up on the reel 16. When the length of film has gone fully through the viewer, the reels 14 and 16 are removed from their respective spindles and their positions reversed so that the now loaded reel 16 will be placed in the upper position and the now empty reel 14 will be placed on the takeup lower position. This reversing of the positions of the reels will cause the row 82 to be visible and it will also invert the images into a correct, upright relationship while masking out row 80. In this fashion, the reels need not be rewound after each use since by merely reversing the positions of the reels both rows of frames may be viewed.

The film advance mechanism, as best shown in FIGS. 1 and 3, is comprised of a bevel gear 84 fixed to a motor drive shaft 86 and in mesh with a bevel pinion gear 88 rotatably mounted to the side of the housing 12 by means of a shaft 90. The shaft 90 is fixed to the pinion gear 88 and is also fixed to the pulley 76 to provide the driving action for the lower takeup reel through the belt 72. Mounted to the inner face of the spindle gear 88 is a circular array of pins 92 evenly spaced about the shaft 90 and within the toothed portion of the gear. When the pinion gear 38 is rotated by the motor, the pins 92 sequentially engage the left-hand end of a pivoted lever 94 supported by means of a bracket 96 on the wall of the housing. The lever 94 is formed with a central opening 98 across which extends a pin 100 pivotally supporting the lever. The right-hand end of the lever is normally urged in a clockwise direction by means of a spring 102 connected to the lever and to the housing wall. In its normal position, the right-hand end of the lever extends into a sprocket hole 78 of the film. When the pinion gear is rotated, one of the pins strikes the left-hand end of the lever, biasing it counterclockwise so as to disengage the right-hand end of the lever from the film. As the gear continues to rotate, the pin disengages the lever permitting it to move back under the force of the spring in a clockwise direction so that the right-hand end again engages the film, causing it to move downwardly as shown in the sequence of FIGS. 3 a, b and c. The pinion gear actuates the lever cyclically thereby causing the film to index in a stop and start motion which, to the viewer, provides a moving action without blurring as would be the case if the film were run on a continuous basis.

As a modification of the invention a stereo effect may be achieved by using stereo movie film involving two rows of stereo frames and utilizing two viewing eyepieces to observe both rows at the same time.

The viewer may be used with both black and white film or with color film. Likewise the film may be stereo for a three dimensional effect or it may be a conventional film. Also, in place of the battery the viewer may be powered by a cord connected to a conventional A.C. outlet.

Having thus described the invention what I claim and desire to obtain by Letters Patent of the United States is:

1. A viewer for a movie film having spaced sprocket holes, comprising
   a. a hollow housing formed with an elongated optical chamber, a drive chamber parallel thereto and a pistol grip handle portion generally perpendicular thereto,
   b. a battery mounted to said housing in said handle portion,
   c. a constant speed DC motor mounted to said housing in said drive chamber,
   d. switch means mounted to said handle portion and connected to said motor and said battery,
   e. a bulb mounted at one end of said optical chamber and connected to said switch means,
   f. reel supporting arms mounted to said housing and adapted to rotatably support a pair of reels exterior to said housing,
   g. at least one of said reels being drivingly connected to said motor,
   h. guide means mounted to said housing at said one end of said optical chamber for guiding said film through said optical chamber perpendicular to the length thereof from one reel to the other,
   i. indexing means mounted in said drive chamber and operatively connected to said motor and adapted to advance said film through said guide means, and
   j. optical means including a viewing eye piece mounted at the other end of said optical chamber and a magnifying lens mounted centrally in said optical chamber for magnifying the illuminated images on said film,
   k. said switch means including sequentially closeable contacts adapted to first illuminate said bulb and then energize said motor,
   l. said guide means including a pair of transparent plates disposed on either side of said film,
   m. said film including a plurality of rows of frames sequentially located along said film in parallel relation, the image in one row of frames being inverted and reversed in sequence with respect to another row of frames and masking means in said viewer for obscuring at least one of said rows during operation of said viewer,
   n. said indexing means including a spring biased lever pivotally and slidably mounted to said housing and having one end thereof movable into and out of film sprocket holes, a motor-driven bevel gear rotatably mounted to said housing adjacent the opposite end of said lever, a plurality of circularly arrayed abutments on said gear adapted to intermittently engage said opposite end upon rotation of said gear to move said one end in and out of driving engagement with said film, said gear being drivingly connected to said one reel.

2. A viewer according to claim 1 wherein said housing includes a detachable cover adjacent said guide means and is formed with a window at said one end of said optical chamber in line with said bulb and optical means.

* * * * *